Figure 1:
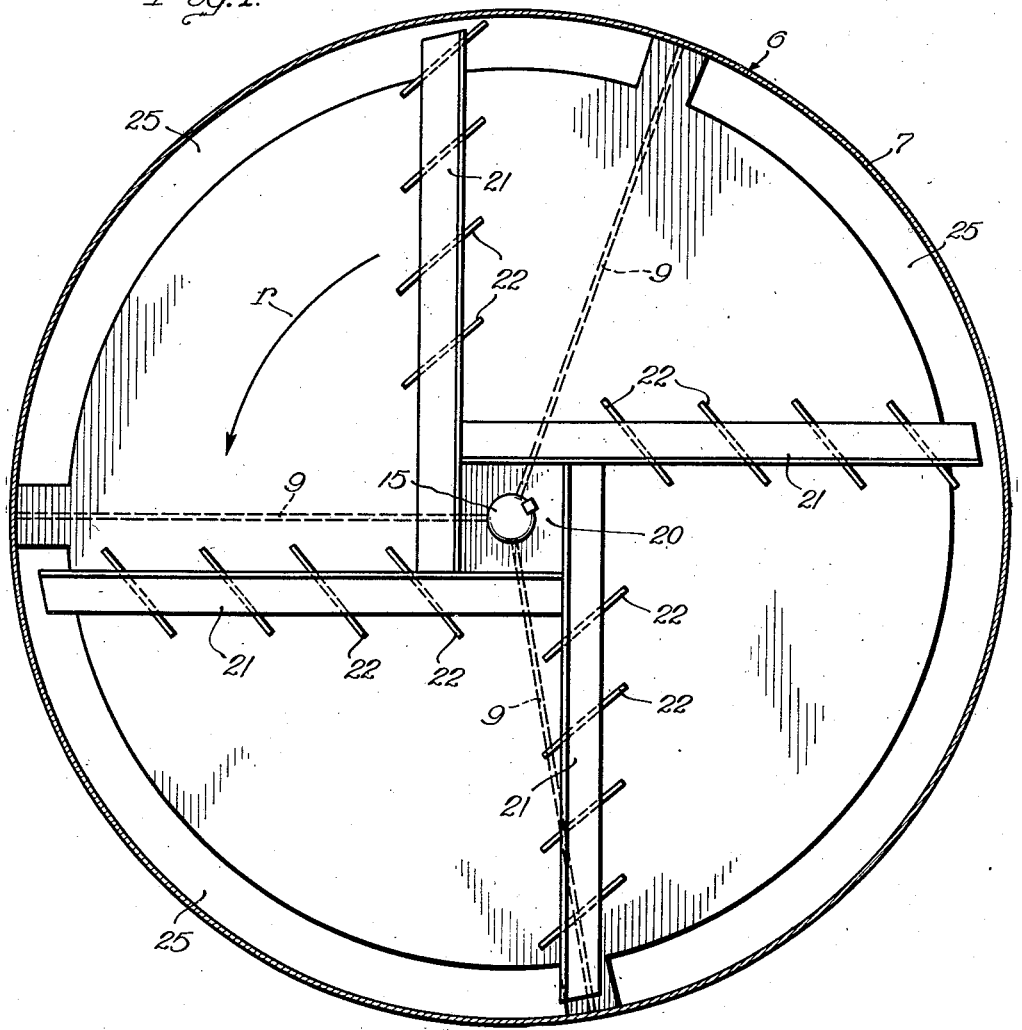

June 26, 1945.  E. W. SHALLOCK  2,379,380
TREATING PLANT
Filed May 14, 1942  2 Sheets-Sheet 2

INVENTOR.
Edward W. Shallock
BY
Brown, Jackson, Boettcher & Dienner
Attys.

Patented June 26, 1945

2,379,380

UNITED STATES PATENT OFFICE 2,379,380

TREATING PLANT

Edward W. Shallock, Chicago, Ill., assignor to American Ore Reclamation Company, Chicago, Ill., a corporation of New York Application May 14, 1942, Serial No. 442,946

4 Claims. (Cl. 259—9)

This invention relates to treating operations and has to do more particularly with a system or plant for treating mixtures of various materials.

In its broader aspects, my invention is applicable to plants for treating materials of many sorts, such, for example, as cement plants, concrete mixing plants, sintering plants, etc. Certain aspects of my invention render it particularly suitable for use in sintering plants for sintering ores, flue dust, and various other materials, and I shall describe my invention as embodied in a sintering plant, by way of example.

In sintering ores, the ore to be sintered is mixed with various other materials, such as coke, limestone aggregates, sinter return fines, flue dust and various other materials, depending upon the nature of the ore, to provide a mix best suited to the desired sintering operation. In a sintering plant employing a plurality of sintering machines, the ore and the other materials to be included in the mix which is to be sintered are stored in bins, the various materials being delivered from the bins in proper proportions, by means of a conveyor system, to a feed hopper from which the materials are delivered to pug mills individual to the sintering machines, in which pug mills the materials are slightly moistened, the materials from each pug mill being delivered to its associated sintering machine. The materials used in forming the mix to be sintered often have widely different physical characteristics and tend to become separated or segregated in the feed hopper. For example, coke delivered on to the conveyor discharging into the feed hopper tends to maintain its position on that conveyor and may be discharged into and collect within the feed hopper at one side thereof, other materials having different physical characteristics than coke tending to collect within the feed hopper at other areas thereof. The result is that the materials discharged into the feed hopper are not effectively mixed together and segregation or separation thereof occurs, the different materials being disposed at different locations or areas within the feed hopper. This hopper is provided at its lower end with a plurality of outlets, one for each pug mill, with associated feeder means for delivering the material from the feed hopper to the pug mill. Due to the segregation of the materials referred to, the material delivered from the feed hopper to one of the pug mills may consist entirely or in large proportion of one material, such as coke, the material delivered to another pug mill may consist of the ore to be sintered without any substantial admixture of other materials, and so on. The result of that is that instead of delivering to the sintering machines a mix of materials best suited for the sintering operation, each of the machines may receive one of the materials only, or a mixture in which one of the materials is present in objectionably large proportion. That is objectionable as rendering difficult the sintering operation with resulting decreased efficiency and output of the sintering machine, as will be obvious. For example, in practice it has been found that in a sintering system or plant of the character referred to, a major portion of the coke may be delivered to one of the sintering machines, causing hot running and burning out of the grates of that machine, there being a deficiency in amount of coke delivered to the other machines, there slowing down the sintering operation and causing unsatisfactory sintering of the material under treatment.

My invention is directed primarily to avoiding the above noted objections with respect to the present type of sintering system or plant now commonly used. To that end, I provide means for mixing together the various materials so as to produce a uniform mix in which the materials are distributed uniformly, and I then deliver this uniform mix to all of the sintering machines, thus assuring that each machine receives a mix in which the materials are in the same proportions as in the mix supplied to the other machines. That assures maximum speed and efficiency in the sintering operation, with corresponding increase in efficiency and output of the sintering machines, while guarding against excessive burning or heating or other injury to the sintering machines due to improper proportioning of the materials supplied thereto. More specifically, I provide a feed hopper to which the materials to be sintered are delivered, this feed hopper having means effective for mixing the materials delivered thereto so as to provide a uniform mix of such materials throughout the cross area of the feed hopper, this mix being then delivered from the feed hopper to the pug mills and thence to the sintering machine. Further objects and advantages of my invention will appear from the detail description.

Figure 2:
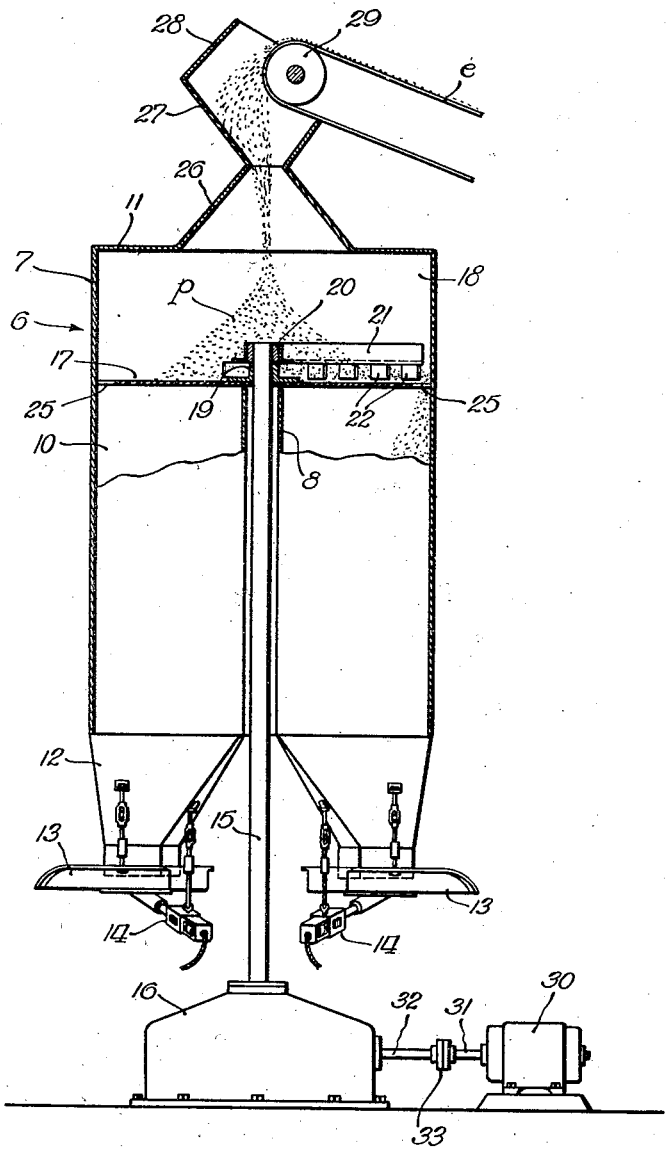

In the drawings:

Figure 1 is a horizontal sectional view of a feed hopper and mixing means embodying my invention, this view being taken in a plane a short distance below the top of the hopper; and Figure 2 is a central vertical sectional view, on a reduced scale, through the feed hopper of Figure 1, this view also showing the feeder means at the lower end of the hopper as well as the means for driving the mixing and propelling means and, fragmentarily, the upper portion of the conveyor for delivering the materials to the feed hopper.

The materials to be mixed are delivered downward into a feed hopper 6, by a conveyor e which extends upward over the hopper, as shown. The feed hopper 6 is provided with means for effecting therein substantially uniform mixing of the materials delivered thereto, thus producing a uniform mix most efficient for effecting the desired sintering operation, this mix being supplied from the feed hopper to all of the sintering machines. Hopper 6 comprises a substantially cylindrical body 7, conveniently formed of suitable metal, this body having a central tubular element or sleeve 8. Three vertical partitions 9 are secured within body 7, conveniently by welding, providing therein three compartments 10 terminating a short distance below top wall 11 of body 7. Each compartment 10 is provided with a discharge chute 12 extending downward from the lower end thereof, this chute being open at its lower end. Suitable means is provided for controlling discharge of material from the respective chutes 12. Any suitable known means may be provided for that purpose, though I preferably provide the vibratory feeder disclosed in my Patent No. 2,100,878, issued November 30, 1937, for Sintering system. This feeder is shown semi-diagrammatically in Figure 2 and comprises a tray 13 suitably suspended from chute 12 for vibration relative thereto, this tray having associated therewith a vibrator 14, also suspended from chute 12, which vibrator comprises cooperating electromagnetic and resilient means for imparting vibratory or recipocatory motion to the tray 13 when the electromagnetic means is appropriately energized. Tray 13 serves, when stationary, to prevent discharge of material from compartment 10 and, when vibrated or reciprocated, discharges material from compartment 10 at a controllable desired rate.

A vertical shaft 15, suitably mounted at its lower end in a speed reducing unit 16 of any suitable known type, extends upward through tubular member or sleeve 8 and through the center of a horizontal disk 17 providing a partition member separating hopper 6 into an upper mixing section 18 and a lower mix receiving section comprising the compartments 10. Shaft 15 extends upward through a flanged bearing collar 19 secured on partition member 17, the latter member being secured, conveniently by welding, to the vertical partitions 10 and to body 7 of hopper 6 and bearing collar 19 being secured, conveniently by welding, to partition member 17. A square hub 20 is keyed or otherwise suitably secured on the upper end portion of shaft 15 for rotation therewith. Arms 21 of angle cross section are suitably secured, conveniently by welding, to the sides of hub 20 and extend outwardly therefrom to within a short distance of the cylindrical wall or body 7 of hopper 6. Each of the arms 21 is provided with a plurality of blades or vanes 22 secured to the under face thereof in a suitable manner, conveniently by welding, inclined transversely of the arm and extending downward therefrom with their lower edges in proximity to the upper face of partition member 17.

The transverse partition member 17 is provided, at its circumference, with elongated openings 25 therethrough corresponding in number to and overlying the respective compartments 10. The vanes 22 of the arm 21 are similarly inclined but are differently spaced with respect to shaft 15. Referring to Figure 1, the direction of rotation of arms 21 with shaft 15 is indicated by the arrow r. It will be noted that the first or innermost vane 22 of the left hand horizontal arm 21 shown in Figure 1 is disposed but a short distance away from hub 20, the first vane 22 of the succeeding or second arm 21, considered in the direction of rotation thereof, is spaced somewhat further away from hub 20, the first vane 22 of the third arm is spaced still further away from hub 20, and the first vane 22 of the fourth arm is spaced further away from hub 20 than the first vane of any other of the arms 21. Accordingly, the sets of vanes of the arms 21 are disposed progressively further away from shaft 15, with respect to the direction of rotation thereof. Due to that arrangement, the vanes of one arm do not track the vanes of the next preceding arm and the vanes 22 of the arms 21, taken collectively, effectively cover the entire operative upper surface of transverse partition member 17 during rotation of arms 21 with shaft 15. It will also be noted that the outermost vane 22 of two successive arms extend outward over the openings 25, one of such outermost vanes extending outward to such an extent as to span substantially the full width of the respective openings 25.

Top wall 11 of hopper 6 is provided with an upwardly extending hood 26 of frustoconical shape opening, at its upper base, into a chute 27 of substantially inverted frustoconical shape, this chute having at its upper portion a hood 28. Chute 27 and hood 28 thereof are open at one side to receive head pulley 29 and the upper end portion of feed conveyor e, passing about this pulley. As previously explained, the ore and the other materials to be included in the mix to be sintered are delivered from bins to the feed conveyor e. These materials are discharged by the conveyor e into chute 27, which directs them downward into the upper mixing section 18 of hopper 6, onto the central portion of transverse partition member 17, these materials assuming the shape of a substantially conical pile p at the central area of partition member 17. During delivery of the materials onto the upper face of partition member 17, shaft 15 is rotated at appropriate speed, by means of a suitable electric motor 30, which may be of any suitable known type, either constant speed or variable speed, shaft 31 of motor 30 having driving connection to shaft 32 of speed reduction unit 16 by means of a coupling 33 of suitable known type.

Rotation of shaft 15 causes rotation of arms 21 in the direction indicated by the arrow r. During this rotation or travel of the arms 21, the vanes 22 exert a plowing action on the materials which, as noted, assume or tend to assume the shape of a substantially conical pile or mound at the central portion of partition member 17. That serves to turn over the materials while propelling them outward from the central portion of partition member 17 toward the periphery thereof and also imparting to them movement about shaft 15. This plowing action of the vanes 22, combined with the outward and rotary movements of the materials, serves to effect thorough mixing together of the materials upon the upper face of partition member 17, so as to produce a substantially uniform mix in the form of a layer extending transversely of the hopper 6 and in which the materials are present in substantially the same proportions throughout the entire extent thereof. This uniform mix is then discharged into the compartments 10, through the openings 25. While the provision of the vertical partitions 9 forming the separate compartments 10 is not essential to the broader aspects of my invention, it is preferable as preventing any tendency to separation or segregation of the materials, such as might occur if the mix were discharged through the openings 25 into the lower section of hopper 6 with the latter section in the form of a single compartment or chamber. The mix delivered into the compartments 10 is discharged therefrom, in any suitable manner, preferably in the manner above described.

While my invention is particularly suited for use in sintering plants, in its broader aspects it can be used to advantage in plants for other purposes, as previously noted, and the mix may be delivered from hopper 6 to suitable machines, other than sintering machines, for further treatment, or into suitable bins or receptacles.

As above indicated, and as will be understood by those skilled in the art, changes in construction and arrangement of parts of my invention may be resorted to without departing from the field and scope thereof, and I intend to include all such variations, as fall within the scope of the appended claims, in this application in which the preferred forms only of my invention have been disclosed.

I claim:

1. In feed hopper and mixing means for use in a sintering plant, a hopper comprising a body divided interiorly into a plurality of compartments by a central sleeve and vertical partitions extending from said sleeve to the surrounding wall of said body, an imperforate transverse partition member in said body overlying said compartments and spaced for portions of its periphery from the surrounding wall of said body defining therewith openings into the respective compartments, mixing and propelling means above said transverse partition member, said sleeve extending from the top to the bottom of said compartments, a rotating shaft extending through said sleeve and said transverse partition member and attached to said mixing and propelling means for imparting rotation thereto, and means for delivering materials to be mixed onto the central area of the upper face of said transverse partition member, the latter being unobstructed at its upper face for free movement thereover to said openings of the mixed materials, said mixing and propelling means comprising members disposed to mix the materials and propel them outward along said transverse partition member to said openings.

2. In feed hopper and mixing means for use in a sintering plant, a hopper comprising a cylindrical body, a central sleeve within said body, vertical partitions secured to said sleeve and to the surrounding wall of said body dividing it interiorly into a plurality of compartments, a fixed transverse partition member within said body overlying said sleeve and compartments and having openings into the latter, said sleeve being closed to said compartments, a rotating shaft extending through said sleeve and said transverse partition member, mixing means secured on said shaft above and in proximity to said transverse partition member, and means for delivering materials to be mixed onto the upper face of said transverse partition member.

3. In feed hopper and mixing means for use in a sintering plant, a hopper comprising a cylindrical body, a central sleeve within said body, vertical partitions secured to said sleeve and to the surrounding wall of said body dividing it interiorly into a plurality of compartments, a fixed transverse partition member within said body overlying said sleeve and compartments and having openings into the latter, said sleeve being closed to said compartments, downwardly diverging discharge chutes extending from the lower ends of said compartments, a rotating shaft extending between said chutes and through said sleeve and said transverse partition member, mixing means secured on said shaft above and in proximity to said transverse partition member, and means for delivering materials to be mixed onto the upper face of said transverse partition member.

4. In feed hopper and mixing means for use in a sintering plant, a hopper comprising a cylindrical body, a sleeve within said body centrally thereof, vertical partitions within said body secured to the surrounding wall thereof and to said sleeve separating said body interiorly into a plurality of compartments, a fixed imperforate transverse partition in said body above said vertical partitions having radial projections extending to the inner face of the surrounding wall of said body and overlying said vertical partitions, the portions of said transverse partition between said projections being spaced from the inner face of the wall of the body defining therewith openings overlying the respective compartments and the upper face of said transverse partition being unobstructed for free movement of materials thereover outwardly thereof to said openings, said sleeve extending from said transverse partition to the bottom of said compartments, a shaft rotatably mounted through said sleeve and extending through said transverse partition and terminating a short distance thereabove leaving the space within said body above said shaft unobstructed for introduction of materials to be mixed, arms secured to said shaft for rotation therewith overlying said transverse partition, propelling and mixing vanes secured to and depending from said arms with their lower edges in proximity to but spaced from the upper face of said transverse partition, and means for delivering materials to be mixed onto the central area of the upper face of said transverse partition, said vanes being disposed to exert a plowing and mixing effect upon the materials and to propel the mixed materials outward over said transverse partition to said openings.

EDWARD W. SHALLOCK.